(12) United States Patent
Sekine et al.

(10) Patent No.: US 7,639,261 B2
(45) Date of Patent: Dec. 29, 2009

(54) TEXTURE MAPPING APPARATUS, METHOD AND PROGRAM

(75) Inventors: Masahiro Sekine, Yokohama (JP);
Yasunobu Yamauchi, Kawasaki (JP);
Isao Mihara, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 462 days.

(21) Appl. No.: 11/687,745

(22) Filed: Mar. 19, 2007

(65) Prior Publication Data

US 2007/0229529 A1 Oct. 4, 2007

(30) Foreign Application Priority Data

Mar. 29, 2006 (JP) ............................. 2006-092233

(51) Int. Cl.
*G09G 5/00* (2006.01)
*G06F 15/16* (2006.01)
*G06T 15/00* (2006.01)
*G06T 11/40* (2006.01)
*G06K 9/40* (2006.01)
*G06K 9/36* (2006.01)
*G06K 9/32* (2006.01)
*G06F 13/00* (2006.01)
*G06T 15/10* (2006.01)

(52) U.S. Cl. ............... 345/582; 345/606; 345/522; 345/501; 345/552; 382/254; 382/276; 382/300; 711/125

(58) Field of Classification Search ........... 345/418, 345/422–423, 426, 428, 581–584, 606, 520, 345/522, 501, 545, 552, 548, 619; 382/254, 382/274, 276, 285, 300, 305; 711/100, 1, 711/123–125; 463/30–34
See application file for complete search history.

(56) References Cited

U.S. PATENT DOCUMENTS

| | | | | |
|---|---|---|---|---|
| 5,757,292 A | * | 5/1998 | Amro et al. ............... | 341/22 |
| 5,790,130 A | * | 8/1998 | Gannett ..................... | 345/587 |
| 5,886,706 A | * | 3/1999 | Alcorn et al. ............. | 345/582 |
| 6,052,126 A | * | 4/2000 | Sakuraba et al. .......... | 345/582 |

(Continued)

OTHER PUBLICATIONS

Kristin J. Dana, et al., "Reflectance and Texture of Real-World Surfaces", ACM Transaction on Graphics, 18(1), 1999, pp. 1-34.

(Continued)

*Primary Examiner*—Wesner Sajous
(74) *Attorney, Agent, or Firm*—Oblon, Spivak, McClelland, Maier & Neustadt, L.L.P.

(57) ABSTRACT

Texture mapping (TM) apparatus includes unit acquiring texture data items (TD) and model data items (MD), unit generating control data used for TM according to TD and MD, unit generating control instructions (CIs) for TM processes corresponding to control data, unit selecting at least one model data item (ALMD) and TD from TD and MD, based on first CI, unit determining arrangement of selected ALMD and TD, unit storing selected ALMD and TD based on determined arrangement, unit selecting, from stored MD and TD, MD and TD used for rendering, based on second CI, unit correcting MD selected for rendering and TD selected for rendering, using first measure designated by third CI, unit performing interpolation on corrected MD and TD, using second measure designated by fourth CI, unit mapping interpolated TD onto interpolated MD, using third measure designated by fifth CI, and unit outputting data as computer graphics data.

26 Claims, 17 Drawing Sheets

U.S. PATENT DOCUMENTS

| | | | |
|---|---|---|---|
| 6,389,504 B1 * | 5/2002 | Tucker et al. | 711/100 |
| 7,129,954 B2 | 10/2006 | Sekine et al. | |
| 2002/0060684 A1 * | 5/2002 | Alcorn et al. | 345/552 |
| 2006/0017741 A1 * | 1/2006 | Sekine et al. | 345/582 |
| 2006/0114262 A1 | 6/2006 | Yamauchi et al. | |
| 2006/0125840 A1 * | 6/2006 | Horton et al. | 345/582 |
| 2006/0132496 A1 * | 6/2006 | Horton et al. | 345/582 |
| 2007/0018994 A1 | 1/2007 | Sekine | |

OTHER PUBLICATIONS

Yasunobu Yamauchi, et al., "Bidirectional Texture Mapping for Realistic Cloth Rendering", (OnlineID 0102), ACM SIGGRAPH 2003 sketch, 2003, 1 page.

* cited by examiner

State (1) of fur    State (2) of fur

Control data
(physical model of material characteristics)

Texture data 2
(slightly rigid material)

Texture data 3
(soft material)

TEXTURE MAPPING APPARATUS, METHOD AND PROGRAM

CROSS-REFERENCE TO RELATED APPLICATIONS

This application is based upon and claims the benefit of priority from prior Japanese Patent Application No. 2006-092233, filed Mar. 29, 2006, the entire contents of which are incorporated herein by reference.

BACKGROUND OF THE INVENTION

1. Field of the Invention

The present invention relates to a texture mapping apparatus, method and program, in which texture data acquired or generated under different conditions is subjected to processes such as adaptive selection and correction, based on control data such as physical laws, and is then mapped onto CG model data.

2. Description of the Related Art

In recent years, three-dimensional computer graphics (CG) techniques have progressed rapidly, enabling realistic graphics rendering as if live-action imaging has been captured. However, much high-quality CG imaging in movies and TV programs is created by low-level manual procedures by animators, and hence requires enormous cost. It is certain that there will be a demand for a further variety of CG content. To meet the demand, it is necessary to produce high-quality CG imaging easily and cheaply.

In CG representation, it is considered particularly difficult to render pliant materials such as cloth, skin and fur. With such materials, it is very important to express changes in the color of the surface or self-shadowing, which are caused by changes in the viewing direction or illumination direction.

Because of this, a method for photographing an actual material and reproducing the characteristics of the material to produce a realistic CG image has recently been utilized. Concerning the rendering of a surface texture depending on the viewing and illumination directions, research into modeling methods, called bidirectional reference distribution function (BRDF), bidirectional texture function (BTF) and polynomial texture maps (PTM) has been advanced. (See, for example, Dana et al., "Reflectance and Texture of Real-World Surfaces", ACM Transaction on Graphics, 18(1):1-34, 1999.) These methods employ the analysis of acquired data to extract a function model. However, in such conversion into a functional model, there is a limit on the rendering of the irregular self-shadowing or brightness changes of a real material, and many problems remain involved.

An alternative approach has been proposed which involves maintaining acquired data as texture data, selecting appropriate data therefrom depending on parameters such as viewing and illumination directions, and mapping the selected texture data onto model data. (See, for instance, Y. Yamauchi, M. Sekine, S. Yanagawa, "Bidirectional Texture Mapping for Realistic Cloth Rendering", ACM SIGGRAPH2003 sketch, 2003.) Although this method can render irregular changes that cannot be rendered by functional modeling, it requires an enormous amount of texture data to accurately render textures.

Because of the limitations of the above approaches, several methods have been proposed for realistically rendering the surface of a CG model, using a minimal amount of data.

However, to realistically render a CG model surface, it is necessary to simulate mechanical changes in the surface caused by factors such as deformation, expansion and contraction, and changes in the condition of the surface due to aging, and changes in color or self-shadowing caused by variations in viewing/illumination position. If texture data corresponding to all changes is generated, the required amount of data is considerable. Further, if a variety of simulations are used for rendering such changes, the methods for storing, selecting and mapping data become very complex.

Therefore, it is necessary to develop a texture mapping apparatus capable of efficiently controlling complex processing, and realizing high-quality CG imaging using a minimal amount of data.

When rendering the surface characteristics of a material that vary according to numerous conditions, using texture data, an enormous number of texture images acquired or created under such different conditions are necessary. Currently used systems cannot store and process such an enormous number of texture images.

Furthermore, when the amount of data is increased in accordance with the viewing and illumination conditions and various other conditions, it is very difficult to manage the memory used to store the increased amount of data, and the texture data selecting/mapping methods become very complex.

BRIEF SUMMARY OF THE INVENTION

In accordance with an aspect of the invention, there is provided a texture mapping apparatus comprising: an acquisition unit configured to acquire a plurality of texture data items acquired or generated under a plurality of conditions, and a plurality of model data items; a first generation unit configured to generate control data used for texture mapping, in accordance with the texture data items and the model data items; a second generation unit configured to generate control instructions for texture mapping processes corresponding to the control data; a data selection unit configured to select at least one model data item and texture data items from the texture data items and the model data items, based on a first control instruction included in the control instructions; a determination unit configured to determine arrangement of the selected at least one model data item and the selected texture data items; a storage unit configured to store the selected at least one model data item and the selected texture data items, based on the determined arrangement; a rendering-data selection unit configured to select, from the stored model data item and the stored texture data items, a model data item and a plurality of texture data items used for rendering, based on a second control instruction included in the control instructions; a correction unit configured to correct the model data item selected for rendering and the texture data items selected for rendering, using a first measure designated by a third control instruction included in the control instructions; an interpolation unit configured to perform interpolation on the corrected model data item and on the corrected texture data items, using a second measure designated by a fourth control instruction included in the control instructions; a mapping unit configured to map the interpolated texture data items onto the interpolated model data item, using a third measure designated by a fifth control instruction included in the control instructions; and an output unit configured to output data acquired by the mapping unit as computer graphics data.

In accordance with another aspect of the invention, there is provided a texture mapping apparatus comprising: an acquisition unit configured to acquire a plurality of texture data items acquired or generated under a plurality of conditions, and a plurality of model data items, and control data used for texture mapping; a generation unit configured to generate control instructions corresponding to the control data for texture mapping processes; a data selection unit configured to select at least one model data item and texture data items from the texture data items and the model data items, based on a first control instruction included in the control instructions; a determination unit configured to determine arrangement of the selected at least one model data items and the selected texture data items; a storage unit configured to store the selected at least one model data item and the selected texture data items, based on the determined arrangement; a rendering-data selection unit configured to select, from the stored model data item and the stored texture data items, a model data item and a plurality of texture data items used for rendering, based on a second control instruction included in the control instructions; a correction unit configured to correct the model data item selected for rendering and the texture data items selected for rendering, using a first manner designated by a third control instruction included in the control instructions; an interpolation unit configured to perform interpolation on the corrected model data item and on the corrected texture data items, using a second manner designated by a fourth control instruction included in the control instructions; a mapping unit configured to map the interpolated texture data items onto the interpolated model data item, using a third manner designated by a fifth control instruction included in the control instructions; and an output unit configured to output data acquired by the mapping unit as computer graphics data.

DETAILED DESCRIPTION OF THE INVENTION

Figure 1:
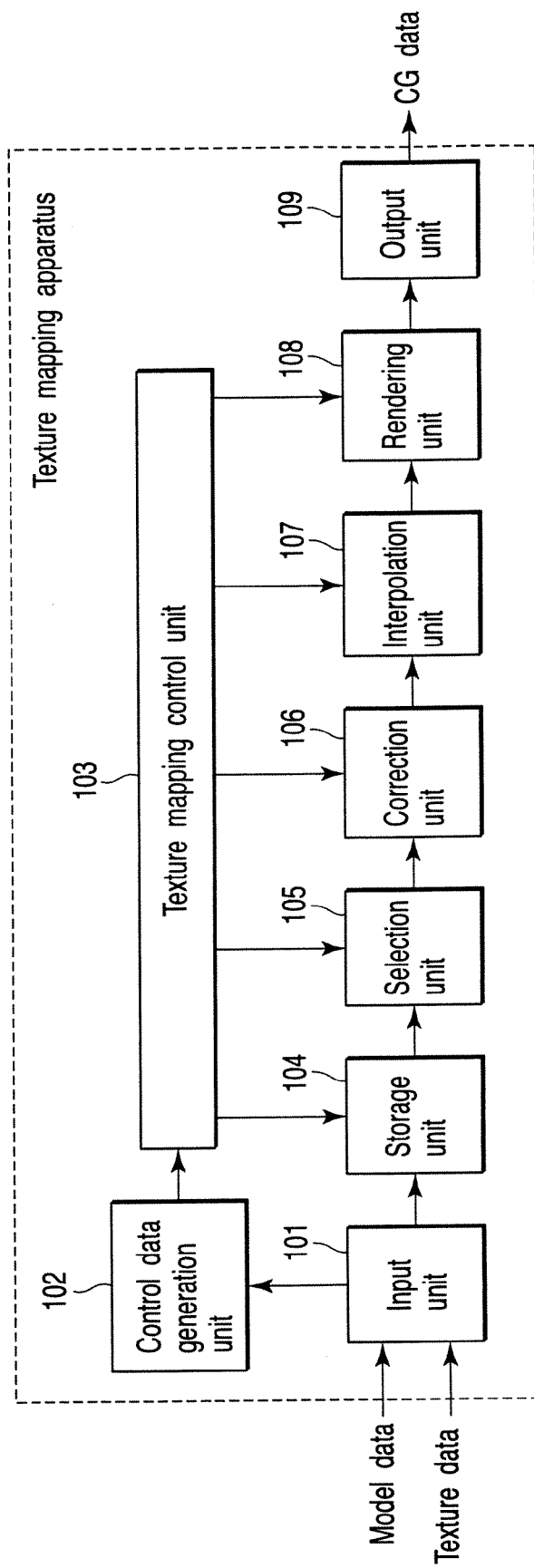
FIG. 1 is a block diagram illustrating a texture mapping apparatus according to embodiments.

Texture mapping apparatuses, methods and programs according to embodiments of the invention will be described in detail with reference to the accompanying drawings.

Firstly, the texture mapping apparatuses, methods and programs according to the embodiments will be described roughly.

The texture mapping apparatuses, methods and programs according to the embodiments are provided for mapping, to a CG model, texture data acquired or generated under different conditions, while appropriately controlling the data, thereby generating CG data. Further, the texture mapping apparatuses, methods and programs according to the embodiments can be used to acquire, from, for example, a network, model data and texture data stored in a database, thereby generating CG data.

The texture mapping apparatuses, methods and programs according to the embodiments can efficiently render the texture of the surface of a material that varies in accordance with the viewing direction and/or illumination direction. They also can process signals that vary under various conditions other than the viewing and illumination conditions, such as time, velocity, acceleration, pressure, temperature and humidity conditions in the realm of nature. They further can process various pixel components other than color components, such as normal vector components, depth components, illumination effect components. Moreover, they control both texture data and model data, which enables selection or correction of an adaptive CG model. As a result, they can express, for example, a change in a CG model animation corresponding to to-be-mapped texture data, or slight movement such as shivering.

The texture mapping apparatuses of the embodiments can efficiently realize the characteristics of the surface of a material that vary under various conditions.

A first embodiment is directed to a series of processing performed by the texture mapping apparatus for supplying control instructions for various types of texture mapping process. The first embodiment employs a process for dealing with a change in the shape of the surface of a material. Specifically, a detailed description will be given of the process performed when texture data corresponding to texture of a shape, deformed or expanded/contracted in the length or width direction thereof, is mapped instead of texture data corresponding to rectangular texture.

A second embodiment is directed to a process performed on a change in the state of the surface of a material. A detailed description will be given of the process performed to render, using texture data, the short fur of, for example, a stuffed toy or carpet. More specifically, in this process, the type of texture to be mapped is changed depending upon the state of the fur (whether it rises or lies).

A third embodiment is directed to the process performed on a change in animation based on control data. Specifically, the hardness or softness of a material can be defined for the corresponding texture data to be mapped. Processing for controlling the movement of a CG model in accordance with a parameter indicating the hardness or softness of the model.

A fourth embodiment is directed to a method for adaptively selecting whether a variety of changes are expressed by a physical model utilizing, for example, a function, or by a live-action model utilizing texture data. Specifically, in this method, a physical model is imparted as control data to sequential change that can be expressed by, for example, a function, while non-sequential change is expressed utilizing minimal texture data.

It is expected that the texture mapping apparatuses, methods and programs according to the embodiments will be loaded into a next-generation graphics-processing engine, and will be applied to a computer-aided design (CAD) and various simulation engines.

FIRST EMBODIMENT

Referring to FIG. 1, a texture mapping apparatus according to a first embodiment will be described.

This apparatus receives a plurality of model data items, and a plurality of texture data items acquired or generated under different conditions, performs adaptive texture mapping based on control data, and outputs CG data.

This apparatus comprises an input unit 101, control data generation unit 102, texture mapping control unit 103, storage unit 104, selection unit 105, correction unit 106, interpolation unit 107, rendering unit 108 and output unit 109.

The input unit 101 receives a plurality of model data items, and a plurality of texture data items acquired or generated under different conditions.

The control data generation unit 102 receives the model data and texture data from the input unit 101, and generates control data used for texture mapping.

The texture mapping control unit 103 receives the control data from the control data generation unit 102, and supplies the units 104 to 108 with control instructions for various types of texture mapping process. The control data generation unit 102 and texture mapping control unit 103 may be formed of a single device. The control data generation unit 102 receives model data and texture data, and the texture mapping control unit 103 generates control data and supplies control instructions to the units.

The storage unit 104 receives the model data and texture data from the input unit 101, and performs data selection and data arrangement in accordance with the control instructions output from the texture mapping control unit 103, thereby storing the selected and arranged data in a memory (not shown).

By the method designated for the selection unit 105 by the texture mapping control unit 103, the selection unit 105 selects, from the model data and texture data stored in the storage unit 104, the model and texture data used for rendering.

By the method designated for the correction unit 106 by the texture mapping control unit 103, the correction unit 106 corrects the model data and texture data selected by the selection unit 105.

By the method designated for the interpolation unit 107 by the texture mapping control unit 103, the interpolation unit 107 performs interpolation on the model data and texture data corrected by the correction unit 106.

By the method designated for the rendering unit 108 by the texture mapping control unit 103, the rendering unit 108 maps the texture data interpolated by the interpolation unit 107 to the model data interpolated by the interpolation unit 107.

The output unit 109 outputs the CG data rendered by the rendering unit 108.

Figure 2:
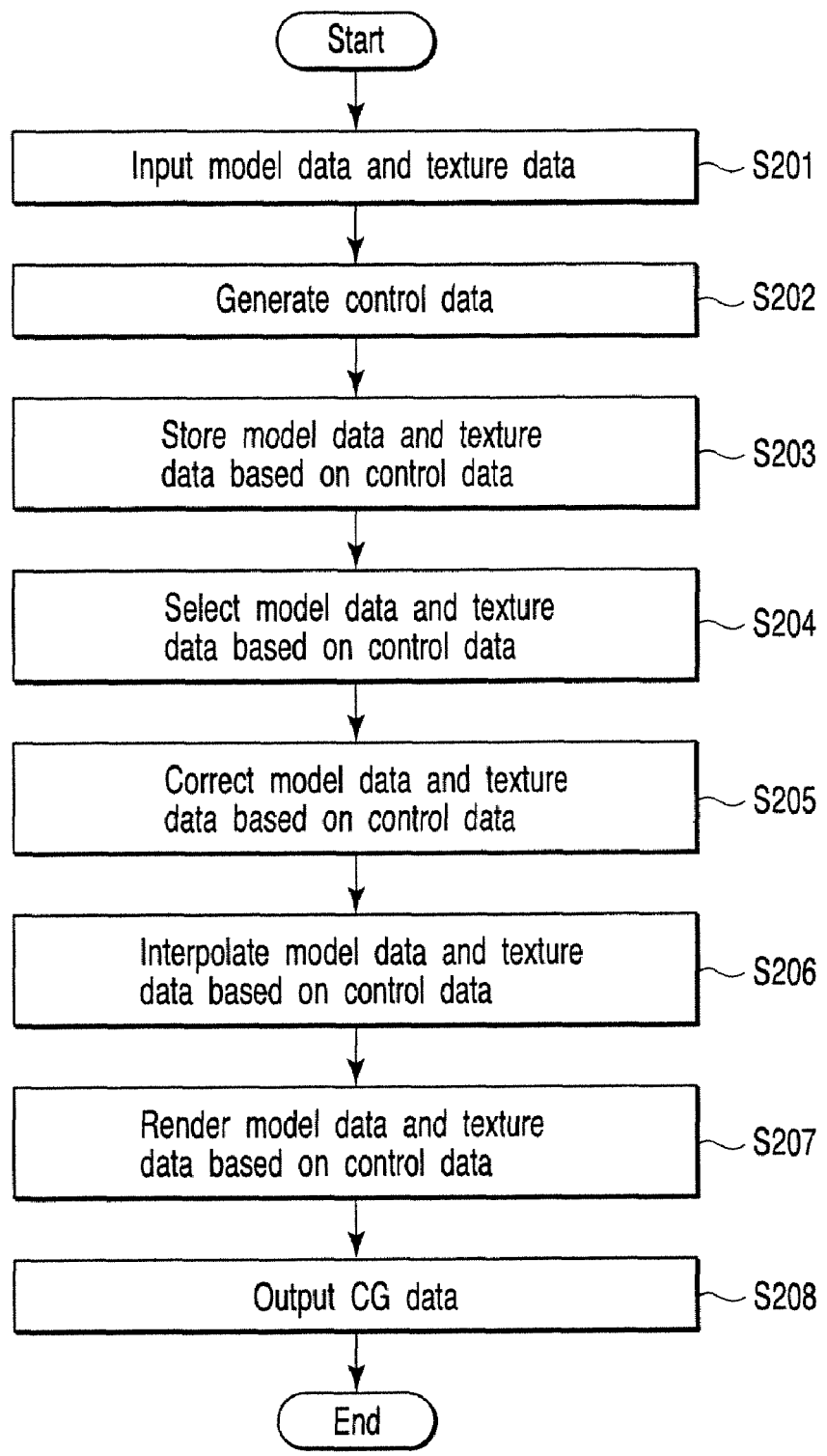
FIG. 2 is a flowchart illustrating an operation example of the texture mapping apparatus of FIG. 1.

Referring then to FIG. 2, an operation example of the texture mapping apparatus of FIG. 1 will be described. FIG. 2 is a flowchart illustrating a series of processing performed by the texture mapping apparatus of FIG. 1. In this embodiment, new CG surface rendering is enabled by the texture mapping apparatus that supplies control instructions for various types of texture mapping process.

Firstly, the input unit 101 receives a plurality of model data items, and a plurality of texture data items acquired or generated under different conditions (step S201). In the first embodiment, assume that a single model data item is input (the case of inputting a plurality of model data items will be described later in the third embodiment described), and that texture data acquired by photographing a material surface transformed in various ways is processed. Various changes in the surface shape of a material will be described later with reference to FIGS. 3, 4 and 5.

Subsequently, the control data generation unit 102 generates control data using the model data and texture data received (step S202). In this case, the unit 102 generates control data necessary for texture mapping process in the storage unit 104, selection unit 105, correction unit 106, interpolation unit 107 and rendering unit 108. The processes performed by these units will hereinafter be described, along with the control data generation methods employed in the processes.

At the next step S203, the storage unit 104 stores the model data and texture data based on the control data. In this case, the data necessary for mapping is selected from the input model data and texture data, and is stored in a memory in a data arrangement that enables efficient data reading. The storage unit 104 determines what amount of data should be stored in the memory. The control instructions based on the control data are used to designate which data is necessary, and what type of data arrangement is optimal. The storage of texture data will be described later with reference to FIGS. 3 and 4. The data arrangement in the memory will be described later with reference to FIGS. 6 and 7.

After that, the selection unit 105 performs the selection of model data and texture data based on the control data (step S204). In the conventional art, only simple texture data selection, in which a plurality of adjacent texture data items are selected based on the viewing and illumination conditions at each vertex of model data, is carried out. However, in the texture mapping apparatus of the first embodiment, control based on control data can be performed even when texture data is selected. For instance, for the condition of deformation, a plurality of texture data items near the designated condition, while for the condition of expansion/contraction, only the closest texture data item is selected. This means trade-off adjustment between the quality of texture mapping and cost. To enhance the quality, a large amount of texture data should be selected. To reduce the cost at the trade-off of quality, a less amount of texture data is selected. Further, if first texture data corresponding to a change in a certain condition can be expressed by second texture data corresponding to a change in another condition, the selection unit 105 also selects the first texture data.

Thereafter, the correction unit 106 corrects the model data and texture data based on the control data (step S205). A content example of correction will be described later with reference to FIG. 8.

At the next step S206, the interpolation unit 107 performs interpolation on the model data and texture data based on the control data. In the conventional art, only linear interpolation is performed on adjacent texture data. In this embodiment, however, higher interpolation can be performed using the control data. Specifically, to what degree the texture data corrected by the correction unit 106 is reliable can be digitized as a degree of reliability. It is very possible that the more the texture data is corrected, the lower degree the definition of the corrected texture data. Therefore, the more the texture data is corrected, the lower the reliability of the texture data. Highly accurate pixel data mapping can be realized by appropriately changing the amount of interpolation in accordance with the degree of reliability. The interpolation unit 107 sets, for example, a smaller interpolation amount for a lower reliability. The degree of reliability is computed by, for example, the correction unit 106.

At the next step S207, the rendering unit 108 renders the model data and texture data based on the control data. At this step, in the conventional art, the pixel data acquired at the preceding step is simply rendered in a rendering frame. In contrast, in the embodiment, the control data enables more highly rendering processing. For instance, the pixel data acquired at the preceding step is compared with ideal texture data imparted as control data, thereby again performing color correction on the pixel data and then rendering the corrected pixel data in a rendering frame. This process will be described later with reference to FIG. 9.

Lastly, the output unit 109 outputs the resultant CG data (step S208).

Figure 3:
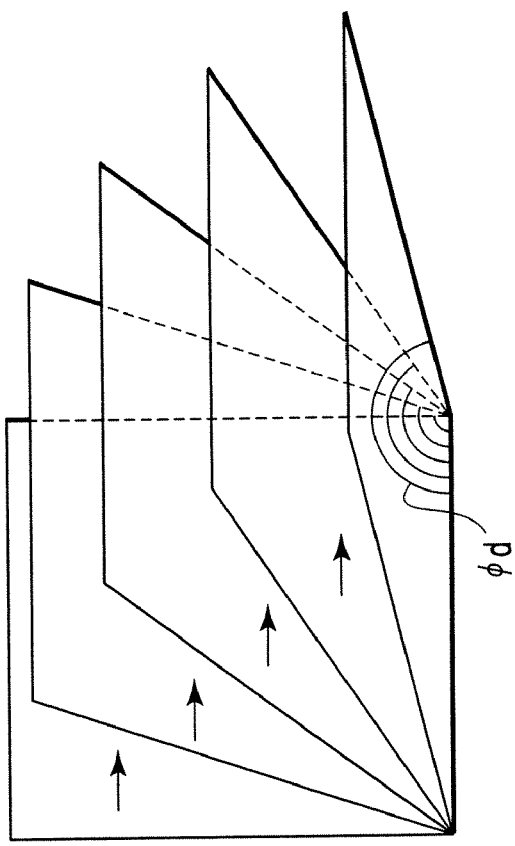
FIG. 3 is a view useful in explaining texture data.
Figure 3:
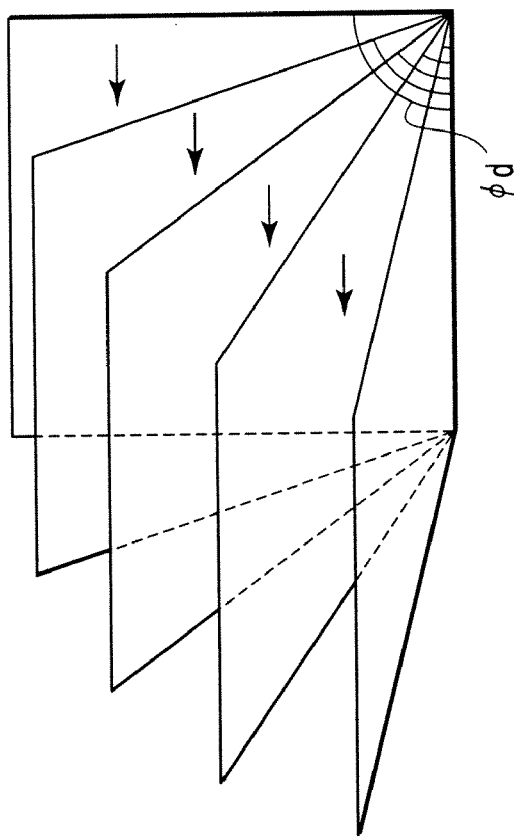
Figure 4:
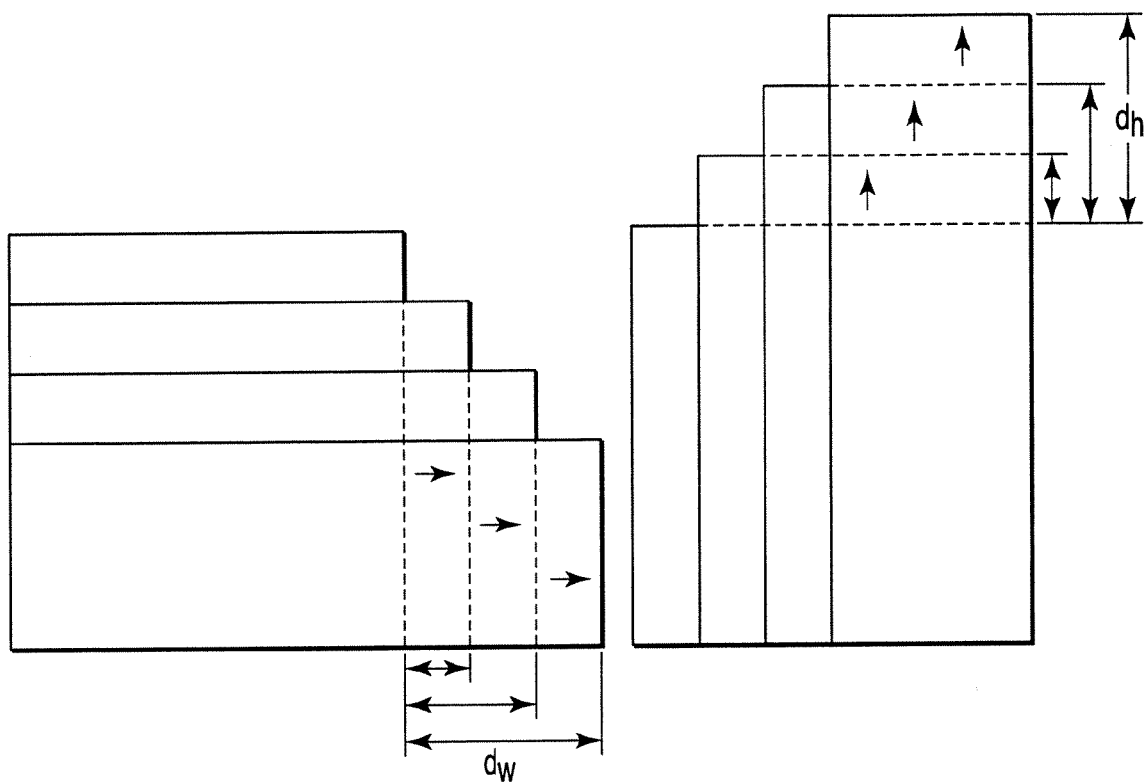
FIG. 4 is another view useful in explaining texture data.
Figure 5:
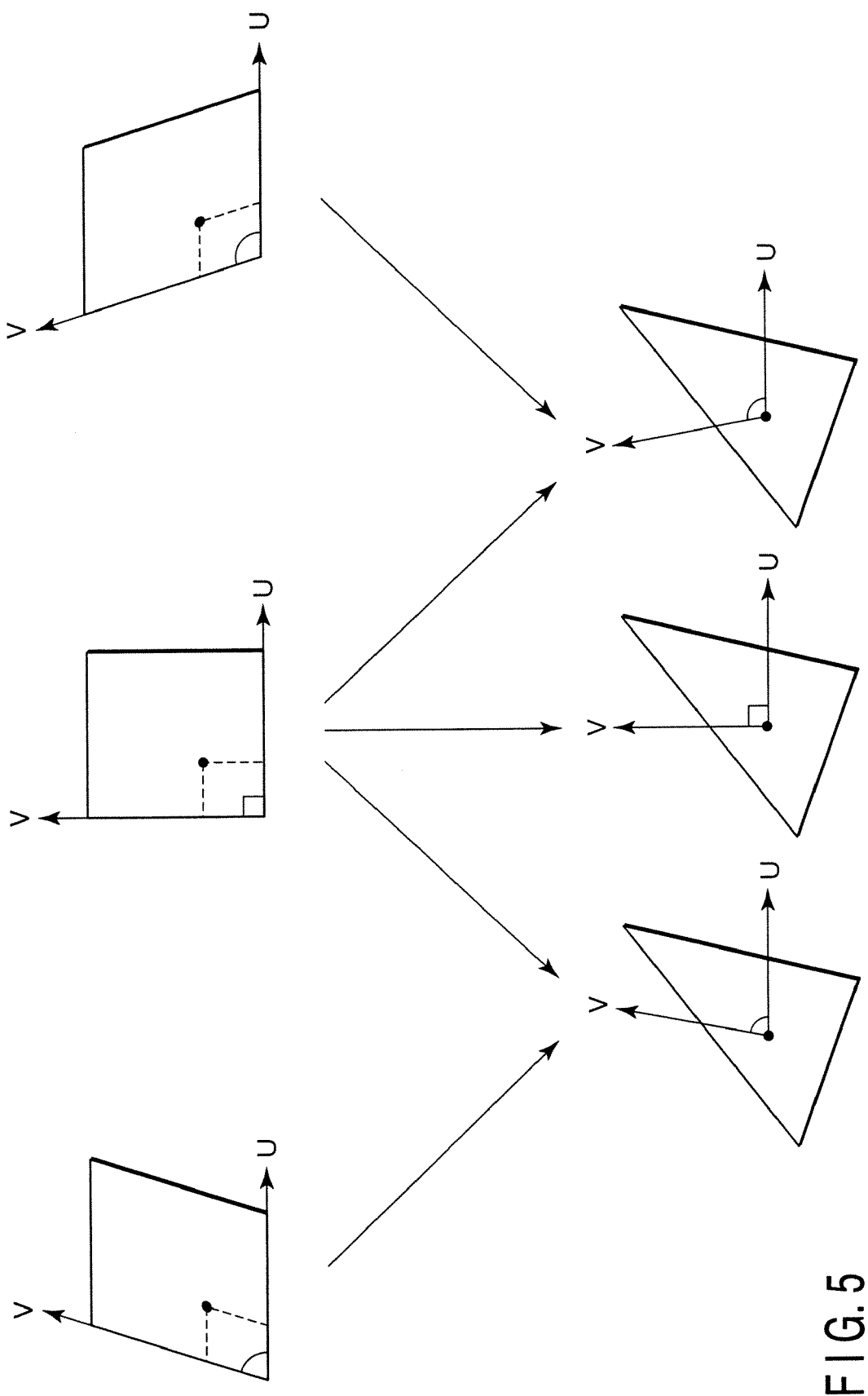
FIG. 5 is a view useful in explaining texture data concerning a change in shape.

Referring then to FIGS. 3, 4 and 5, the texture data input to the input unit 101 will be described.

The input unit 101 receives texture data acquired by photographing a material surface transformed in various ways. FIGS. 3 and 4 show various changes in the surface shape of the material. Specifically, FIG. 3 shows shapes deformed by $\phi_d$, and FIG. 4 shows shapes horizontally and vertically extended by $d_w$ and $d_h$, respectively. In the first embodiment, a description will be given of the process of mapping, in which texture data is selected, corrected, interpolated and mapped in accordance with the deformation of the texture to be mapped onto the CG model as shown in FIG. 5.

Referring to FIGS. 3 and 4, a description will firstly be given of whether the storage unit 104 stores texture data.

When an instruction from the texture mapping control unit 103 indicates, for example, that CG data to be rendered does not contain expressions related to expansion/contraction of a material, or contains such expressions but does not require so high-quality expressions as requires live-action texture data, the storage unit 104 does not have to store, in the memory, a plurality of texture data items acquired by various expansions/contractions as shown in FIG. 4. It is sufficient if the storage unit 104 stores only a single standard texture data item in the memory.

In contrast, when an instruction from the texture mapping control unit 103 indicates that a high-quality expression corresponding to the deformation of a surface is needed, it is necessary to store, in the memory at small sampling intervals, a plurality of texture data items acquired from various deformations as shown in FIG. 3.

Figure 6:
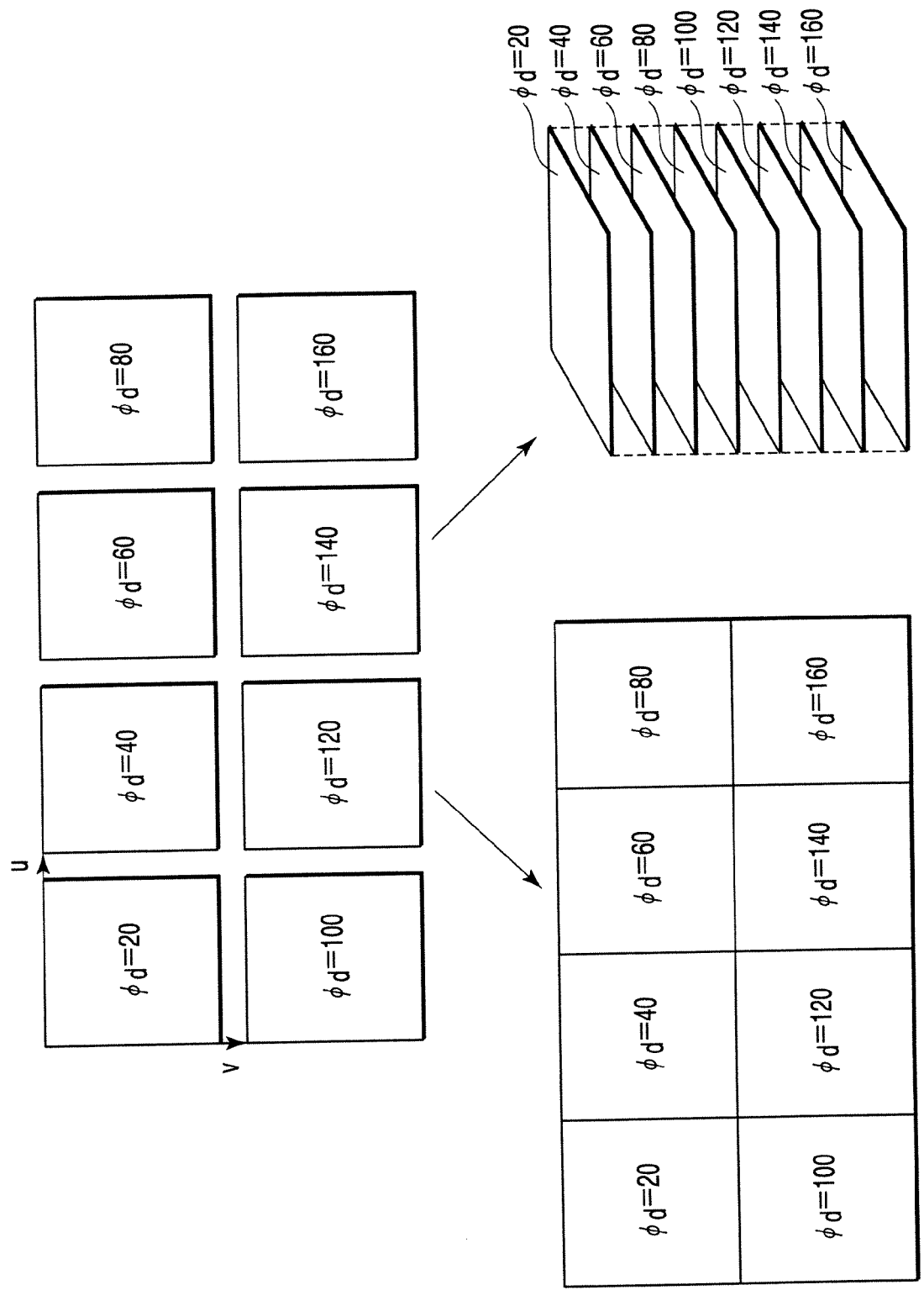
FIG. 6 is a view useful in explaining an arrangement of data in a memory incorporated in the storage unit appearing in FIG. 1.
Figure 7:
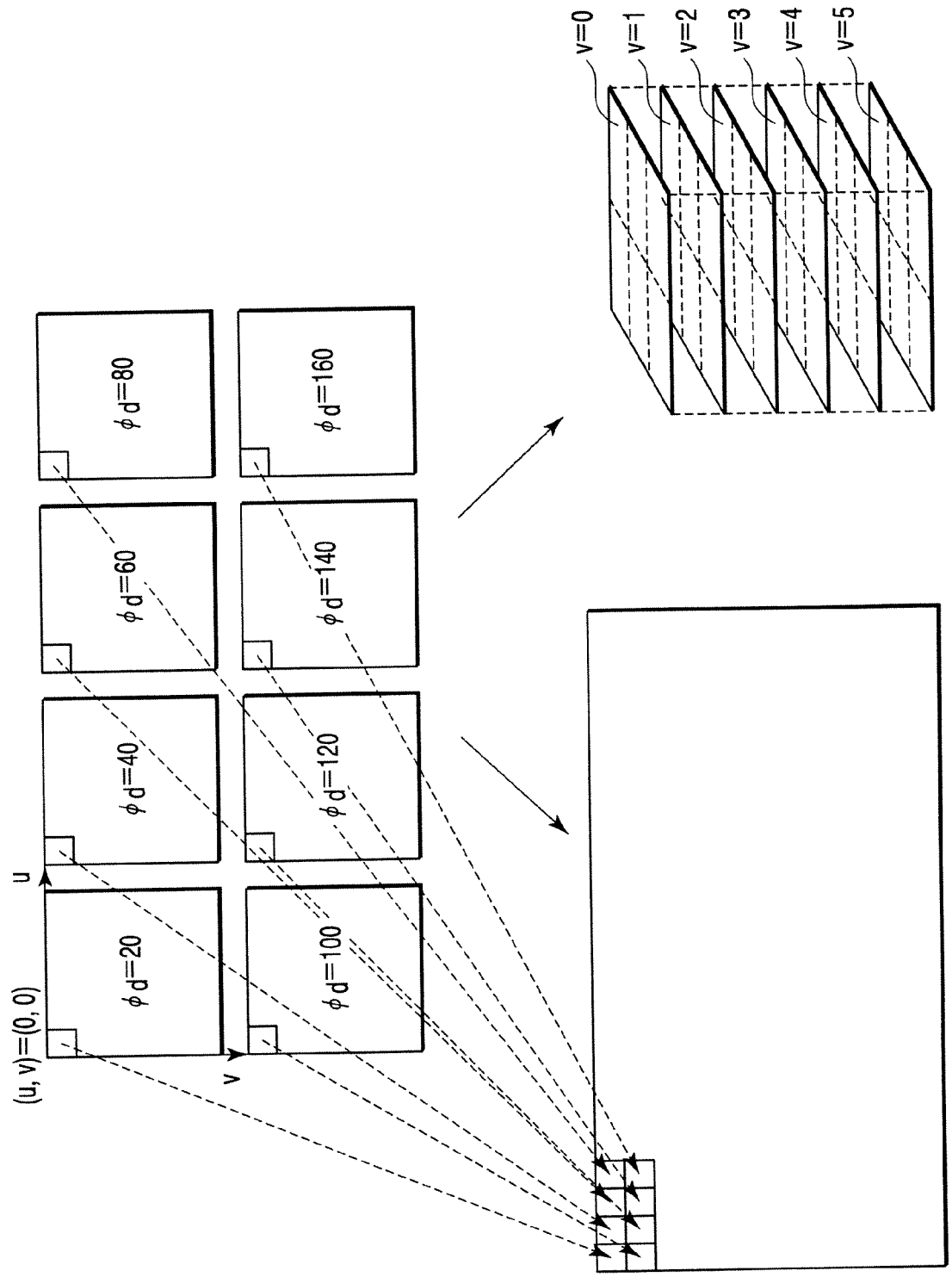
FIG. 7 is a view useful in explaining another arrangement of data in the memory of the storage unit appearing in FIG. 1.

Referring to FIGS. 6 and 7, a description will be given of the arrangement of texture data stored in the memory of the storage unit 104.

A control instruction concerning appropriate data arrangement issued by the texture mapping control unit 103 instructs the storage unit 104 to efficiently arrange texture data in light of the content of processing for mapping and/or the characteristics of a graphics LSI used. The storage unit 104 determines, in accordance with the characteristics of the using hardware, data arrangement that enhances the hit rate of data in the cache (memory) and minimizes the number of operations of loading data. For example, since it is not efficient to arrange texture data corresponding to obliquely deformed texture, the storage unit 104 performs, for example, affine transformation in which the texture data corresponding to the obliquely deformed texture is converted into texture data corresponding to rectangular texture, and then is stored in the memory. For instance, the memory arrangements as shown in FIGS. 6 and 7 are performed.

In general, a plurality of texture data items corresponding to texture deformed at different angles are all converted into texture data corresponding to rectangular texture and then stored in the memory. However, if various texture coordinates (u, v) of various conditions $\phi_d$ are randomly accessed, the storage unit 104 had better arrange texture data as shown in FIG. 6. The left part of FIG. 6 shows texture data of various conditions arranged two-dimensionally, while the right part of FIG. 6 shows texture data of various conditions arranged three-dimensionally (i.e., the texture data items in the form of layers are stacked on each other). The appropriate one of these arrangements is determined, depending upon which arrangement the graphics LSI corresponds to, or which arrangement realizes quicker data access.

Further, if corresponding pairs of texture coordinates (u, v) of various conditions $\phi_d$ are often accessed, the storage unit 104 had better arrange texture data as shown in FIG. 7. The left part of FIG. 7 shows the case where the pixel data corresponding to the corresponding pairs of texture coordinates (u, v) of all conditions $\phi_d$ are united and arranged in one place. Further, the right part of FIG. 7 shows the case where pixel data similar to the pixel data shown in the left part of FIG. 7 are arranged in the form of layers and stacked on each other. Thus, the method of storing pixel data into the memory can be appropriately controlled in accordance with the content of processing for mapping and/or the type of graphics LSI.

Figure 8:
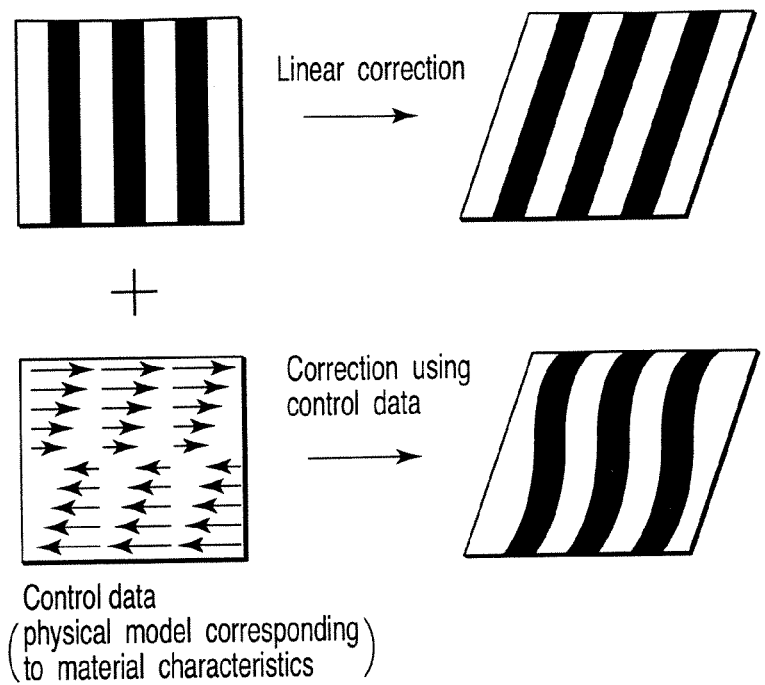
FIG. 8 is a view illustrating an example of correction performed by the correction unit appearing in FIG. 1.

Referring to FIG. 8, an example of correction performed by the correction unit 106 will be described. FIG. 8 shows a corrected example of texture data based on control data.

Assume here that when mapping texture data of $\phi_d=100°$, the selection unit 105 has selected texture data of $\phi_d=90°$ and texture data of $\phi_d=110°$. At this time, if the correction unit 106 performs correction on the texture data of $\phi_d=90°$ to make it close to the texture data of $\phi_d=100°$, more realistic expression can be realized. However, if control is not performed using the control data, any correction other than such linear correction as shown in the upper right part of FIG. 8 cannot be achieved. In contrast, if the texture mapping control unit 103 imparts such control data as shown in the lower left part of FIG. 8, such irregular correction as shown in the lower right part of FIG. 8 can be achieved. This control data reflects a physical model of material characteristics and can be derived by analyzing texture data items acquired under a plurality of deformation conditions.

Figure 9:
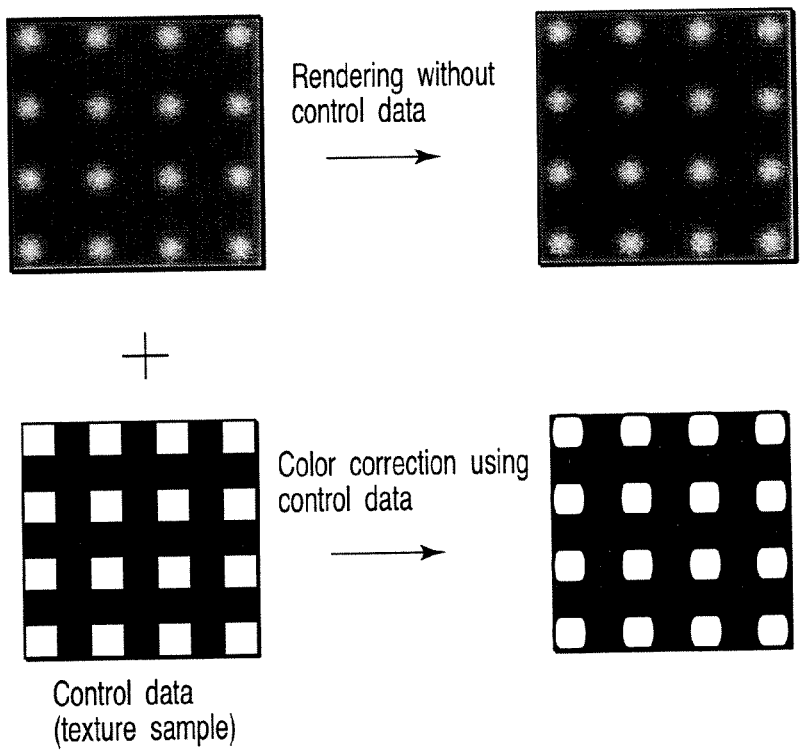
FIG. 9 is a view illustrating an example of rendering performed by the rendering unit appearing in FIG. 1.

Referring to FIG. 9, an example of rendering processing performed by the rendering unit 108 will be described.

When such texture data as shown in the upper left part of FIG. 9 is output from the interpolation unit 107, if it is directly rendered, the definition of the entire image may well be reduced. In contrast, if the texture mapping control unit 103 imparts, to the rendering unit 108, control data (texture data)

as instructions for realizing rendering of a more ideal image, the rendering unit 108 recognizes that at least the grating pattern as shown in the lower left part of FIG. 9 should be reproduced, and hence performs slight color correction on the texture data to thereby render an image of a relatively high-quality, As described above, in the first embodiment, texture mapping process is performed with various types of control added in the respective phases of processing. This enables rendering of high-quality CG data that is impossible in the conventional art. In the first embodiment, changes in the surface of a material, such as deformation, expansion and contraction, can be expressed in a CG model. Namely, the characteristics of changes in the shape of the material can be reproduced realistically.

Figure 10:
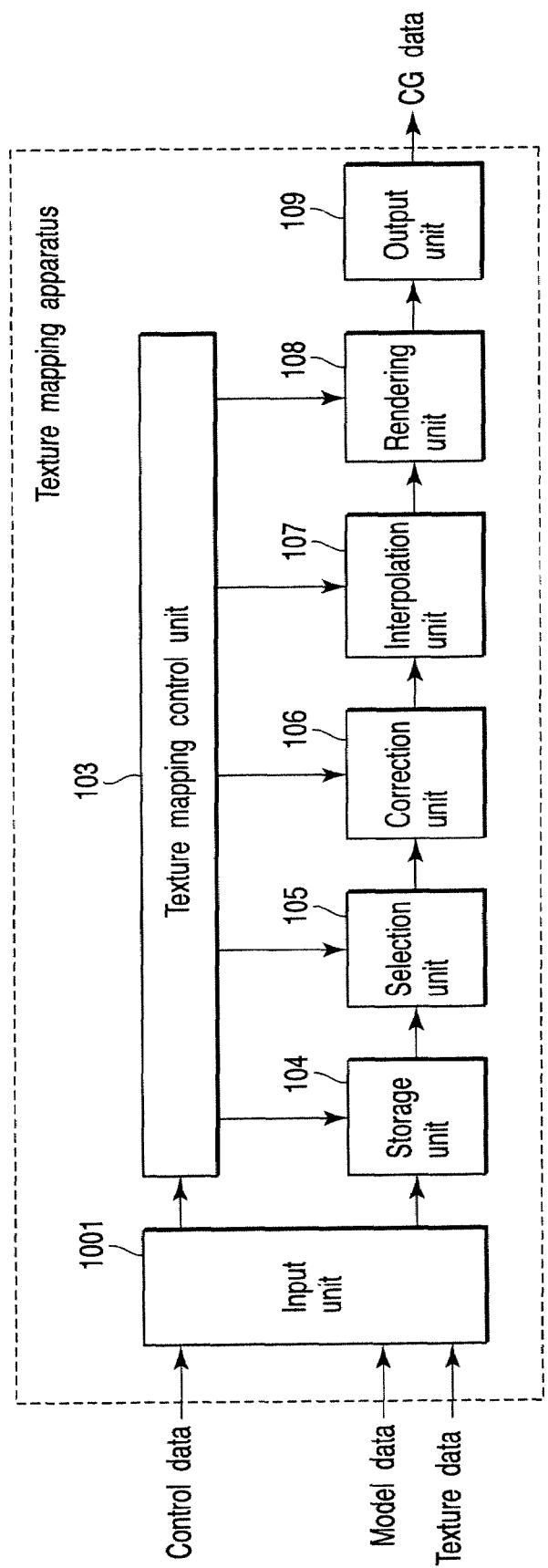
FIG. 10 is a block diagram illustrating another texture mapping apparatus according to the embodiments.
Figure 11:
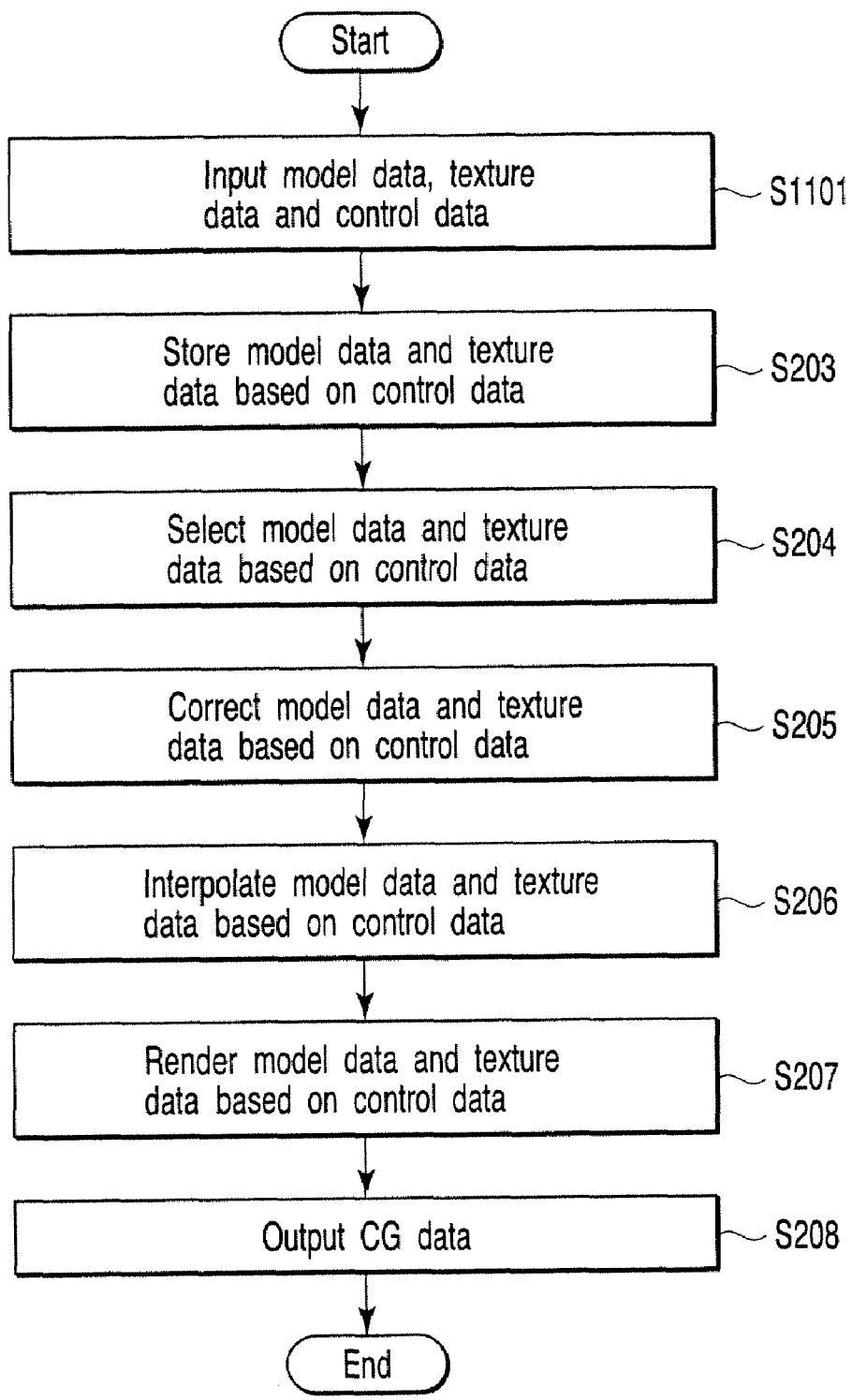
FIG. 11 is a flowchart illustrating an operation example of the texture mapping apparatus of FIG. 10.

Further, the first embodiment can employ the texture mapping apparatus as shown in FIG. 10. FIG. 11 shows a sequence of processing performed by the texture mapping apparatus shown in FIG. 10. In the description below, elements and steps similar to those described above are denoted by corresponding reference numbers, and no description is given thereof.

The texture mapping apparatus of FIG. 10 does not incorporate the control data generation unit 102 employed in the apparatus of FIG. 1, and receives control data from the outside via an input unit 1001. This apparatus can also acquire control data that cannot be generated based on model data or texture data (step S1101).

The texture mapping apparatuses shown in FIGS. 1 and 10 are characterized in that the steps of texture mapping are executed in accordance with respective control instructions based on control data.

Figure 12:
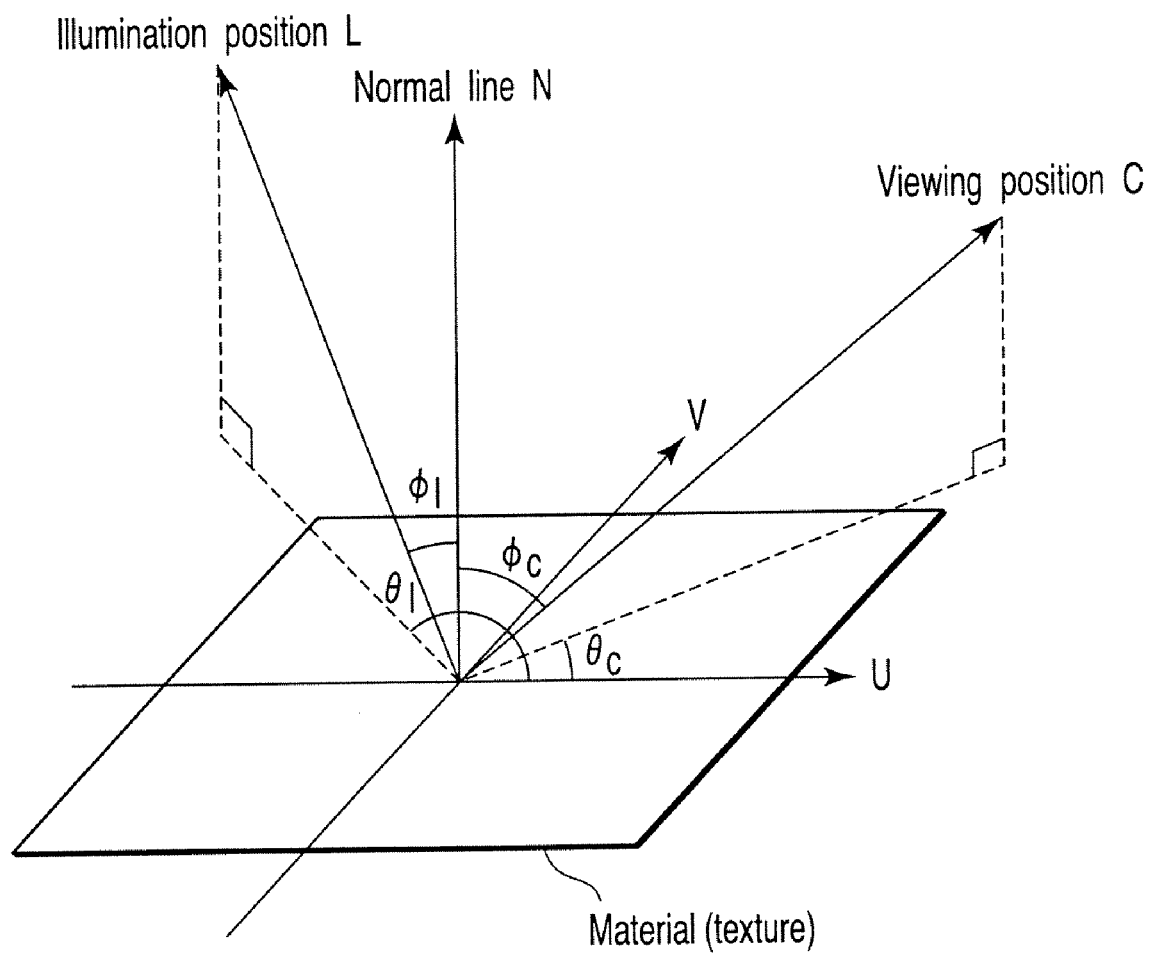
FIG. 12 is a view illustrating the relationship between the viewing position, illumination position and texture.

In the conventional texture mapping apparatuses, adaptive processing based on model data and texture data cannot be executed, and texture mapping is realized by simple texture selection, correction and interpolation. For instance, assume that textures are mapped, which are acquired in the space as shown in FIG. 12 while changing the viewing and illumination directions $\theta_c$, $\phi_c$, $\theta_1$ and $\phi_1$ by respective preset angles. In this case, the thus-acquired texture data is regularly stored in the memory, viewing and illumination conditions are computed for each vertex of a CG model, texture data corresponding to the conditions are selected from the memory, and the selected texture data is mapped onto the CG model. If there is no texture data that matches the viewing and illumination conditions, a plurality of adjacent texture data items are subjected to linear interpolation to acquire color data to be mapped. The conventional texture mapping apparatuses cannot perform any process other than the above-mentioned simple process, i.e., cannot adaptively change the process in accordance with model data or texture data.

SECOND EMBODIMENT

A second embodiment is directed to a process for expressing, using the texture mapping apparatus of FIG. 1 or 10, a change in the state of a material whose data is to be mapped onto the surface of a CG model. The entire process performed by the texture mapping apparatus is described in the first embodiment, referring to FIG. 2, and therefore a description will only be given of the characterizing process employed in the second embodiment.

Figure 13:
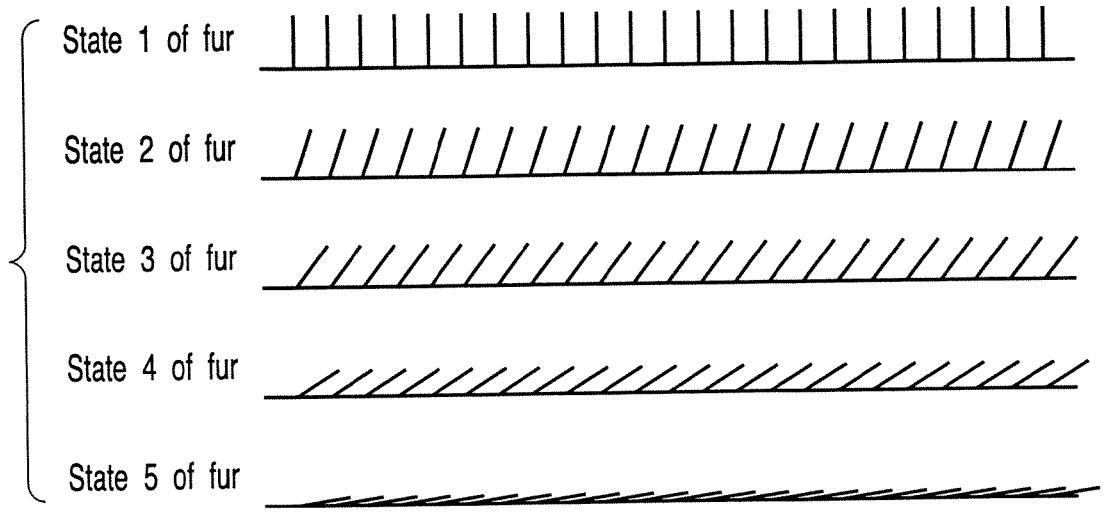
FIG. 13 is a view illustrating texture data input by an input unit in a second embodiment.

In the second embodiment, the input unit 101 receives such texture data items as shown in FIG. 13, as texture data acquired or generated under different conditions. In the case of FIG. 13, the texture data indicates various states of short fur for use in a stuffed toy or carpet. Actually, it is difficult to align the fur. In a broad sense, the texture data acquired by the input unit 101 indicates, for example, "State 1 of fur" in which the fur stands at right angles to the surface, "State 2 of fur" in which the fur stands at 70° with respect to the surface, "State 3 of fur" in which the fur stands at 50° with respect to the surface, "State 4 of fur" in which the fur stands at 30° with respect to the surface, and "State 5 of fur" in which the fur stands at 10° with respect to the surface.

As in the first embodiment, the storage unit 104 arranges the texture data in an efficient form in light of the content of processing for mapping and the characteristics of the graphics LSI, and stores the efficiently arranged texture data in the memory. Efficient data arrangement is preferably an arrangement that enables certain pixel data in texture data to be hit with high probability in the cache (memory) when loading the pixel data, and hence does not require much time to load each pixel data item. Also preferably, efficient data arrangement should be an arrangement that enables the interpolation function of the graphics LSI to be effectively utilized, and enables the number of loading operations of pixel data to be minimized.

Figure 14:
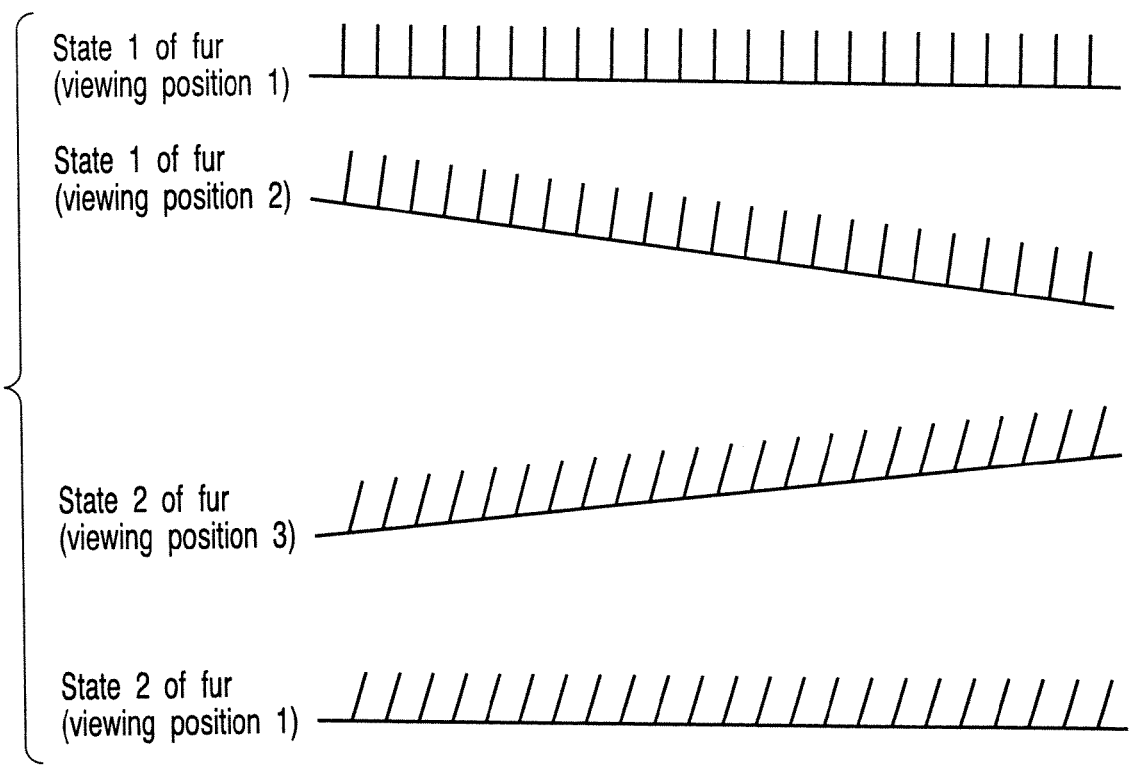
FIG. 14 is a view useful in explaining texture data selected by a selection unit in the second embodiment.

The selection unit 105 can select texture data in light of a change in, for example, viewing condition, as well as a change in the state of a material. This will be described referring to FIG. 14. Assume here that texture data indicating the fur standing at 80° with respect to the surface is mapped onto a certain vertex of model data. In general, texture data items corresponding to "State 1 of fur (viewing position 1)" in which the fur stands at 90° with respect to the surface, and "State 2 of fur (viewing position 1)" in which the fur stands at 70° with respect to the surface, are selected for mapping. Alternatively, texture data items corresponding to "State 1 of fur (viewing position 2)" and "State 2 of fur (viewing position 3)", which are acquired by varying the viewing condition, can be selected. As can be understood from FIG. 14, all selected texture data items are similar to the fur standing at 80° with respect to the surface. Thus, a change in the state of a material can be approximately expressed by a change in viewing condition.

Figure 15A:
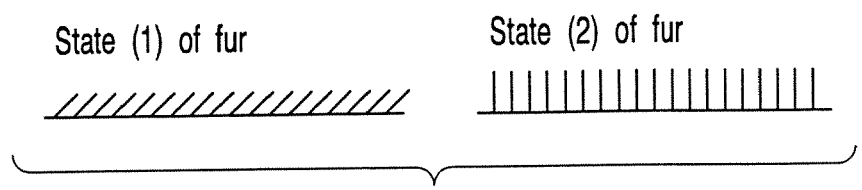
FIG. 15A is a view illustrating two texture data items that are alternatives selected by the selection unit in the second embodiment.
Figure 15B:
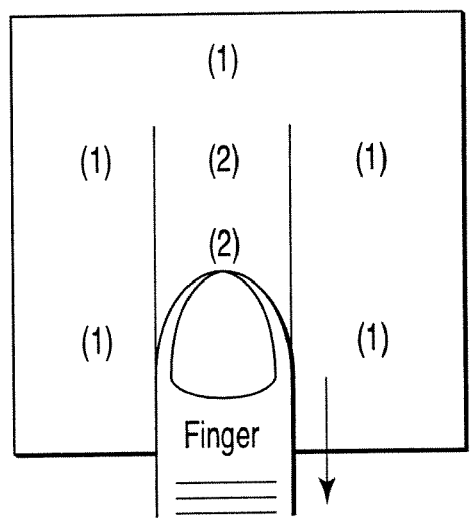
FIG. 15B is a view illustrating a distribution of texture data selected by the selection unit.

The interpolation unit 107 not only performs linear interpolation on selected texture data, but also controls the interpolation method in accordance with the characteristics of changes in material surface. This will be described with reference to FIGS. 15A, 15B and 15C. In this case, a scene is considered in which the state of fur is changed by touching the surface of a stuffed toy or carpet by a user's finger. Suppose that all fur is firstly in "State (1)", i.e., all fur lies. In this state, if the surface of the fur is touched by a user's finger, the touched portion assumes "State (2)", i.e., it stands. For texture mapping, the selection unit 105 selects "State (1)" for the portion that is not touched, and "State (2)" for the touched portion.

Figure 15C:
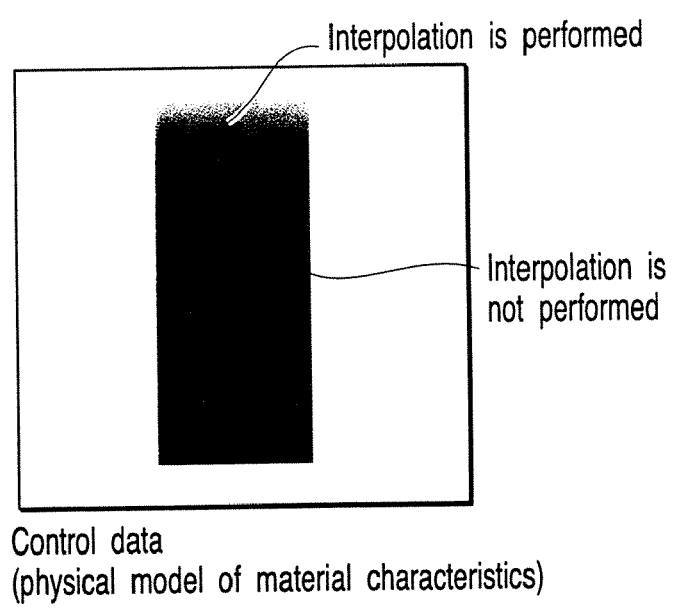
FIG. 15C is a view illustrating control data input to the selection unit.

The boundary therebetween involves a problem. Considering the characteristics of changes in the state of fur, the boundary between "State (1)" and "State (2)" includes a portion at which the line of the boundary is clearly seen, and a portion in which the state gradually varies between the states (1) and (2). In light of this, the control data as shown in FIG. 15C is prepared to control the interpolation method. In this example, for the portion at which the touch is started, smooth interpolation between "State (1)" and "State (2)" is carried out, and the portions corresponding to the sides of the finger are processed so that no interpolation is carried out to clearly show boundary lines. The interpolation unit 107 performs interpolation between "State (1)" and "State (2)" by, for example, adding weights to physical model values corresponding to these states. Thus, an arbitrary interpolation process, in which it is determined whether interpolation is performed, or whether linear interpolation or nonlinear interpolation is performed, can be realized, using control data.

The above-described second embodiment can realistically reproduce changes in the surface of a material.

THIRD EMBODIMENT

A third embodiment is directed to a process for varying the state of animation in accordance with to-be-mapped texture data, or varying the texture mapping method in accordance with the state of animation, using the texture mapping apparatus of FIG. 1 or 10. In the third embodiment, control of, in particular, model data will be described. The entire process performed by the texture mapping apparatus is described in the first embodiment, referring to FIG. 2, and therefore a description will be only given of the characterizing process employed in the third embodiment.

Figure 16A:
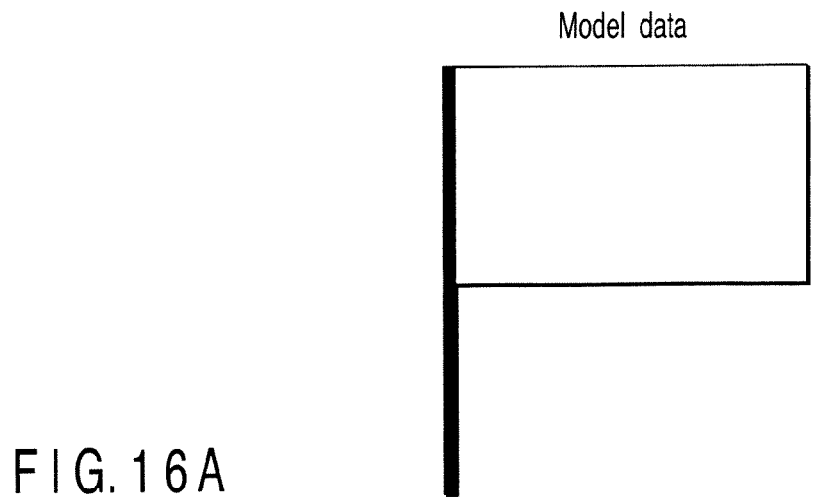
FIG. 16A is a view illustrating an example of model data stored in a storage unit.
Figure 16B:
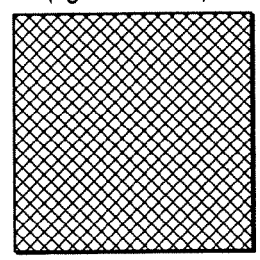
FIG. 16B is a view illustrating a certain texture data item corresponding to the model data of FIG. 16A.
Figure 16B:
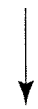
Figure 16B:
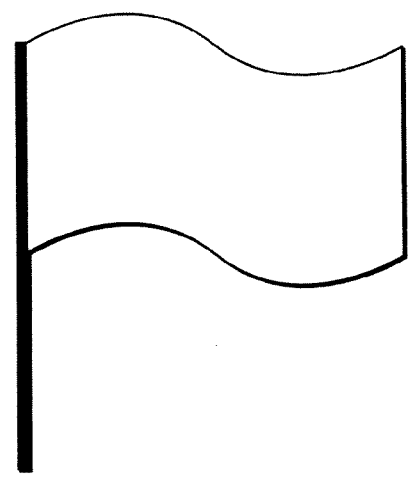
Figure 16C:
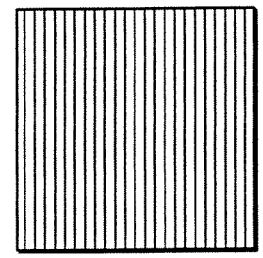
FIG. 16C is a view illustrating another texture data item corresponding to the model data of FIG. 16A.
Figure 16C:
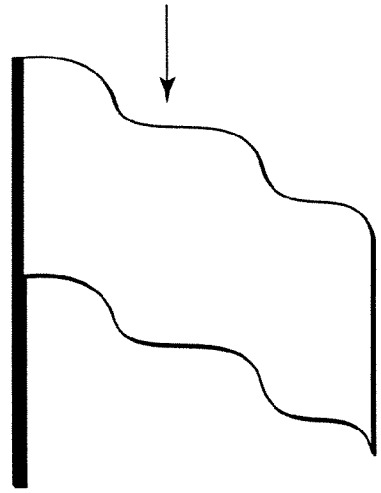
Figure 16D:
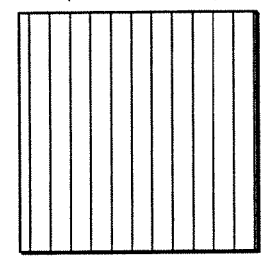
FIG. 16D is a view illustrating yet another texture data item corresponding to the model data of FIG. 16A.
Figure 16D:
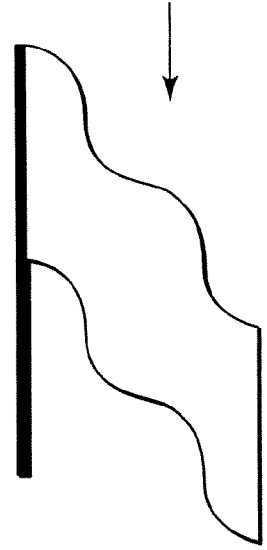

Firstly, referring to FIGS. 16A to 16D, a method example for varying the state of animation in accordance with to-be-mapped texture data will be described. Assume here that the storage unit 104 stores three types of texture data in the memory, and the texture data to be mapped onto model data is switched therebetween. The three types of texture data have different characteristics. Assume that "Texture data 1" shown in FIG. 16B indicates a rigid material, "Texture data 2" shown in FIG. 16C indicates a slightly rigid material, and "Texture data 3" shown in FIG. 16D indicates a soft material. In this case, it is necessary to change the state of animation as shown in FIGS. 16B, 16C and 16D, in accordance with the to-be-mapped texture data. Specifically, when selecting model data, the selection unit 105 determines appropriate animation data in accordance with to-be-mapped texture data, based on control data from the texture mapping control unit 103. The animation data is contained in the model data and determines how the CG model corresponding to the model data should move. The movement of the CG model depends upon both the animation data and texture data. For instance, the rigidity/softness of a material is subjected to estimation of several stages, and a matrix for expressing animation is changed in accordance with a parameter indicating the estimation result, thereby changing the state of animation.

A method for changing the texture mapping method in accordance with the state of animation will be described. When expressing a muscle or skin, if the muscle is expanded/contracted or the skin slightly shivers in accordance with the movement of the model data, the model data becomes more realistic. To realize such expression, information indicating a change in shape or a fine movement caused by a change in the state of animation is embedded in texture data corresponding to, for example, a muscle or skin. The texture mapping control unit 103 controls the shape of model data or the state of animation in accordance with to-be-mapped texture data. More specifically, when the correction unit 106 corrects model data, it slightly changes the position coordinates of vertex data included in the model data, or the texture coordinates, based on to-be-mapped texture data and the state of animation.

As described above, when performing texture mapping, the above-described third embodiment can control model data, the state of animation and the mapping method, etc., based on control data.

FOURTH EMBODIMENT

A fourth embodiment is directed to a process for simultaneously expressing a variety of changes, using the texture mapping apparatus of FIG. 1 or 10. The entire process performed by the texture mapping apparatus is described in the first embodiment, referring to FIG. 2, and therefore a description will be only given of the characterizing process employed in the fourth embodiment.

The surface of a CG model changes because of various factors, such as viewing condition, illumination condition, the surface shape/state of a material, temperature, humidity and degradation. Texture data corresponding to all such changes may be stored, and the to-be-mapped texture data be switched therebetween in accordance with condition. However, to simultaneously express all changes, an enormous amount of texture data is required.

To realize efficient mapping, continuous changes in material surface that can be expressed by, for example, a function are discriminated from discontinuous changes in material surface that cannot be expressed without texture data. Specifically, the control data generation unit 102 generates control data for causing a continuously varying material surface portion to be expressed by a physical model using, for example, a function (a physical model that can be expressed analytically), based on the analysis result of texture data or given physical laws. At this time, the selection unit 105, correction unit 106 and interpolation unit 107 utilize the control data when selecting, correcting and interpolating texture data, respectively.

In contrast, since a discontinuously varying material surface portion cannot be expressed without texture data, the control data generation unit 102 generates control data for causing minimum texture data to be stored in the memory. The control data indicates the difference between the portion of texture data that is expressed by physical model data, and the texture data. Since, in general, texture data is acquired by adding or subtracting values to or from the corresponding values computed from, for example, physical model data, it is sufficient if the texture data holds only the added or subtracted values. This means that the texture data can be formed of a smaller number of bits.

As described above, in the fourth embodiment, model-based expression and live-action-based expression are mixed and balanced in the texture mapping apparatus, which enables high-quality CG representation to be realized by a less amount of data.

(Modification)

Figure 17:
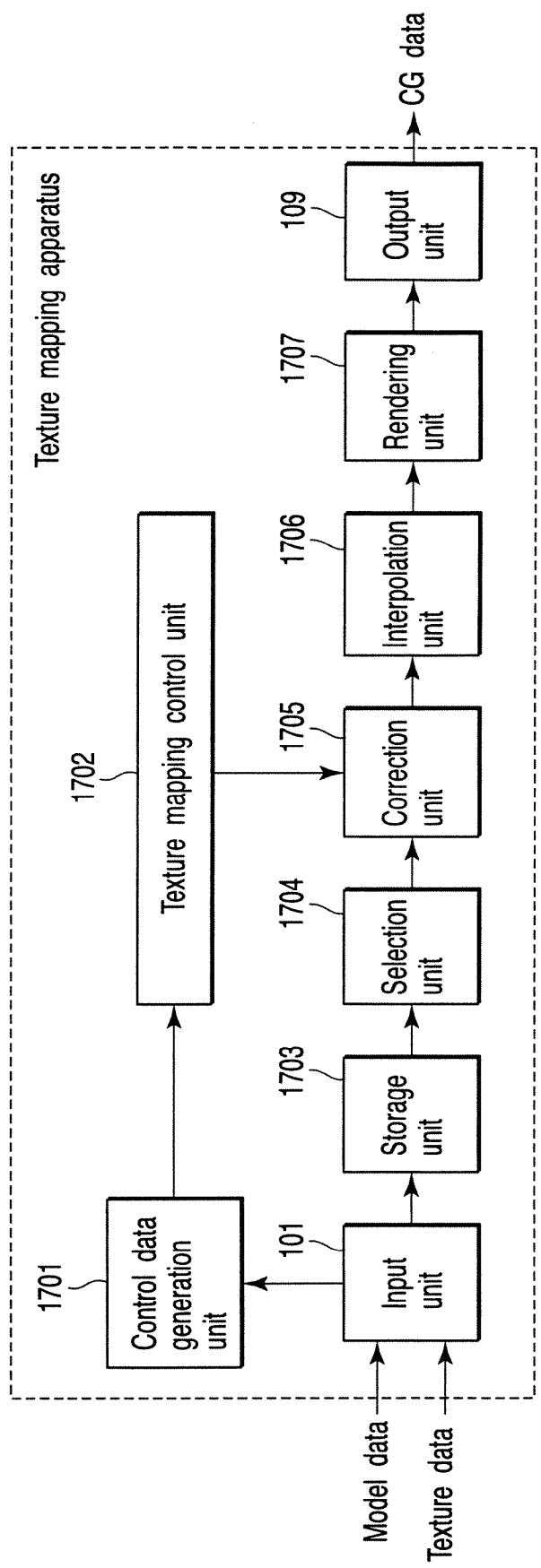
FIG. 17 is a block diagram illustrating a texture mapping apparatus according to a modification of the embodiments.
Figure 18:
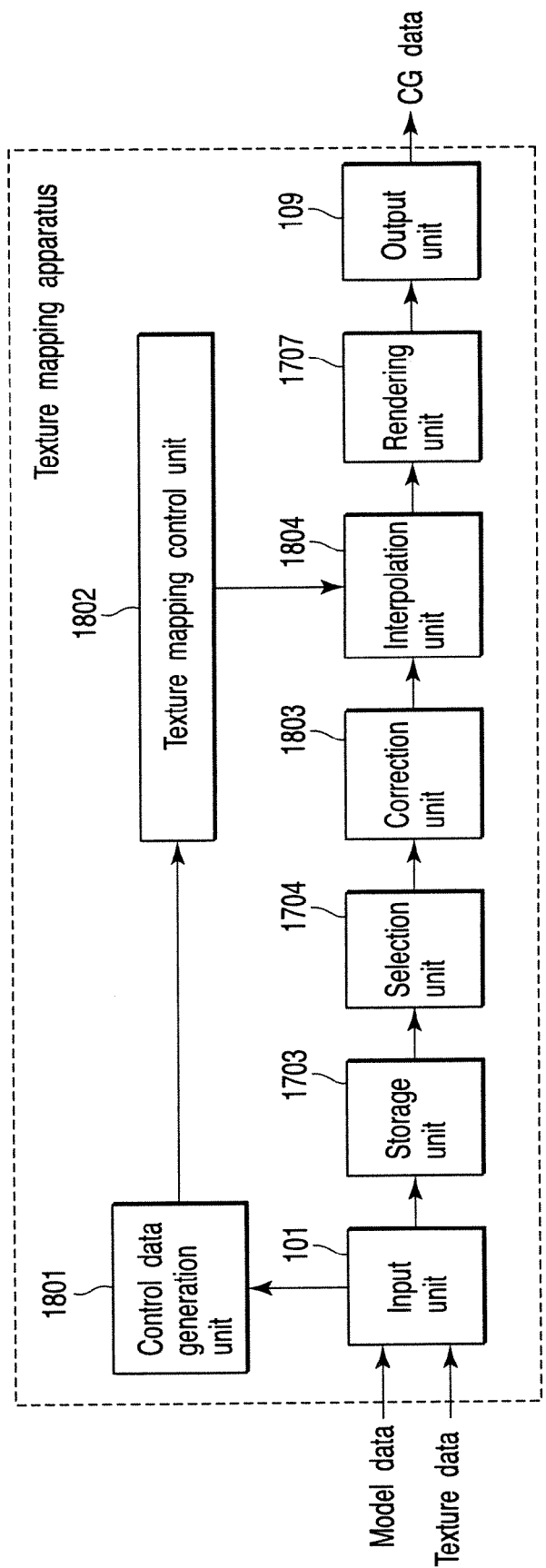
FIG. 18 is a block diagram illustrating a texture mapping apparatus according to another modification of the embodiments.

Referring to FIGS. 17 and 18, a modification will be described. The texture mapping control unit does not have to supply control instructions in all processes necessary for texture mapping, but may supply a control instruction only to a correction unit 1705 or interpolation unit 1804 as shown in FIG. 17 or 18. Further, structural elements employed in different embodiments may be appropriately combined.

The texture mapping apparatus of FIG. 17 comprises, as new units, a control data generation unit 1701, texture mapping control unit 1702, storage unit 1703, selection unit 1704, correction unit 1705, interpolation unit 1706 and rendering unit 1707. This modification differs from the apparatus of FIG. 1 in that the texture mapping control unit 1702 supplies control data only to the correction unit 1705. The correction unit 1705 performs the same process as the above. The control data generation unit 1701 generates the control data to be supplied to the correction unit 1705. The storage unit 1703, selection unit 1704, interpolation unit 1706 and rendering unit 1707 perform the same processes as the above, except for receiving the control data.

The same can be said of the case of FIG. 18. Namely, the texture mapping apparatus of FIG. 18 comprises, as new units, a control data generation unit 1801, texture mapping control unit 1802, correction unit 1803 and interpolation unit 1804. This modification differs from the apparatus of FIG. 1 in that the texture mapping control unit 1802 supplies control data only to the interpolation unit 1804. The interpolation unit 1804 performs the same process as the above. The control data generation unit 1801 generates the control data to be supplied to the interpolation unit 1804. The storage unit 1703, selection unit 1704 and correction unit 1803 perform the same processes as the above, except for receiving the control data.

The apparatuses shown in FIGS. 17 and 18 are just examples. The texture mapping control unit 103 may supply control data to at least one, two, three or four units selected from the group of the storage unit 104, selection unit 105, correction unit 106, interpolation unit 107 and rendering unit 108, and the at least one, two, three or four units may perform processes similar to the above, based on the control data.

As described above, the first embodiment is directed to the overall flow of the texture mapping process in which control data is supplied in various processes for texture mapping, and also directed to the process for dealing with a change in the surface shape of a material. The second embodiment is directed to the process for dealing with a change in the surface state of a material. The third embodiment is directed to the control method for model data. The fourth embodiment is directed to a method for appropriately discriminating mode-based expression from live-action-based expression to thereby realize efficient processing.

The embodiments of the invention can realistically express the surface texture of a CG model that varies in accordance with various conditions including viewing and illumination conditions, using a texture mapping apparatus for supplying control data in various processes for texture mapping. By appropriately controlling the way of use of model data and texture data, higher definition expression can be realized with a less amount of data. Further, the characteristics of hardware, such as a graphics LSI, can be effectively utilized to thereby realize high-speed texture mapping.

Also, texture data items that vary under various conditions are adaptively mapped onto CG model data, based on control data, thereby enabling the surface texture of the CG model data to be expressed realistically. In addition, the control data enables minimal model data and texture data to be selected, with the result that higher definition expression can be realized with a less amount of data.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A texture mapping apparatus comprising:
an acquisition unit configured to acquire a plurality of texture data items acquired or generated under a plurality of conditions, and a plurality of model data items;
a first generation unit configured to generate control data used for texture mapping, in accordance with the texture data items and the model data items;
a second generation unit configured to generate control instructions for texture mapping processes corresponding to the control data;
a data selection unit configured to select at least one model data item and texture data items from the texture data items and the model data items, based on a first control instruction included in the control instructions;
a determination unit configured to determine arrangement of the at least one model data item and the texture data items;
a storage unit configured to store the at least one model data item and the texture data items, based on the determined arrangement;
a rendering-data selection unit configured to select, from the stored model data item and the stored texture data items, a model data item and a plurality of texture data items used for rendering, based on a second control instruction included in the control instructions;
a correction unit configured to correct the model data item selected for rendering and the texture data items selected for rendering, using a first measure designated by a third control instruction included in the control instructions;
an interpolation unit configured to perform interpolation on the corrected model data item and on the corrected texture data items, using a second measure designated by a fourth control instruction included in the control instructions;
a mapping unit configured to map the interpolated texture data items onto the interpolated model data item, using a third measure designated by a fifth control instruction included in the control instructions; and
an output unit configured to output data acquired by the mapping unit as computer graphics data.

2. The apparatus according to claim 1, wherein:
the data selection unit is configured to determine what capacity of data be stored in a memory, based on the first control instruction;
the determination unit is configured to determine the arrangement of the at least one model data item and the texture data items to enhance a hit rate of the texture data items in the memory and to minimize number of operations of loading the texture data items; and
the storage unit is configured to store the texture data items into the memory after performing an affine transformation process on the texture data items for converting the texture data items into normalized rectangular data, or after rearranging the texture data items, in order to arrange the texture data items in the arrangement determined by the determination unit.

3. The apparatus according to claim 1, wherein the rendering-data selection unit is configured to perform switching between selection, from the stored texture data items, of texture data items closest to the second control instruction, and selection, from the stored texture data items, of a single texture data item closest to the second control instruction, the rendering-data selection unit being configured to increase number of texture data items to be selected from the stored texture data items, at the time that a first change included in changes in the conditions indicates that quality is to be enhanced, the rendering-data selection unit being configured to decrease the number of texture data items to be selected from the stored texture data items, at the time that a second change included in the changes in the conditions indicates that quality fails to be enhanced, the rendering-data selection unit being configured to select first texture data corresponding to a change included in the changes in the conditions, at the time that the first texture data covers second texture data corresponding to another change included in the changes in the conditions.

4. The apparatus according to claim 1, wherein:
the second generation unit is configured to generate, as the second control instruction, a material characteristic instruction for causing a characteristic of a texture material to be reflected in accordance with the interpolated texture data; and
the rendering-data selection unit is configured to select, from the stored model data item and the stored texture data items, a model data item corresponding to the material characteristic instruction, or animation data contained in the model data item corresponding to the material characteristic instruction.

5. The apparatus according to claim 1, wherein the correction unit is configured to receive, as the third control instruction, an instruction to correct each of the texture data items selected for rendering, in accordance with physical model data based on a physical law, or in accordance with physical model data based on texture data items included in the texture data items.

6. The apparatus according to claim 1, wherein the correction unit is configured to receive, as the third control instruction, an instruction to correct position coordinates of vertex data contained in the model data item selected for rendering, in accordance with the texture data items selected for rendering, the model data item selected for rendering, or the animation data.

7. The apparatus according to claim 1, wherein:
if the correction unit is configured to perform a greater scale of correction on the texture data items selected for rendering and the model data item selected for rendering, the correction unit is configured to impart a lower degree of reliability to the texture data items selected for rendering and the model data item selected for rendering; and
if the lower degree of reliability is imparted, the interpolation unit is configured to receive, as the fourth control instruction, an instruction to set a lower interpolation rate.

8. The apparatus according to claim 1, wherein:
the second generation unit is configured to generate reference texture data as the fourth control instruction; and
the interpolation unit is configured to correct the interpolated texture data items to make the interpolated texture data items close to the reference texture data.

9. The apparatus according to claim 1, wherein the second generation unit is configured to generate the control instructions by analyzing the model data items and the texture data items.

10. The apparatus according to claim 1, wherein the second generation unit is configured to analyze each of the texture data items to divide each of the texture data items into a first portion which includes a continuous change and is expressed by physical model data, and a second portion which includes a discontinuous change and is only expressed by each of the texture data items, the second generation unit being configured to generate the physical model data based on physical laws or the analysis result of each of the texture data items, the second generation unit being configured to generate the control instruction to select each of the texture data items, the control instruction indicating a difference between the first portion and each of the texture data items.

11. The apparatus according to claim 10, wherein the second generation unit is configured to generate the control instruction to the data selection unit, the rendering-data selection unit, the correction unit, the interpolation unit and the mapping unit.

12. A texture mapping apparatus comprising:
an acquisition unit configured to acquire a plurality of texture data items acquired or generated under a plurality of conditions, and a plurality of model data items, and control data used for texture mapping;
a generation unit configured to generate control instructions corresponding to the control data for texture mapping processes;
a data selection unit configured to select at least one model data item and texture data items from the texture data items and the model data items, based on a first control instruction included in the control instructions;
a determination unit configured to determine arrangement of the at least one model data items and the texture data items;
a storage unit configured to store the at least one model data item and the texture data items, based on the determined arrangement;
a rendering-data selection unit configured to select, from the stored model data item and the stored texture data items, a model data item and a plurality of texture data items used for rendering, based on a second control instruction included in the control instructions;
a correction unit configured to correct the model data item selected for rendering and the texture data items selected for rendering, using a first manner designated by a third control instruction included in the control instructions;
an interpolation unit configured to perform interpolation on the corrected model data item and on the corrected texture data items, using a second manner designated by a fourth control instruction included in the control instructions;
a mapping unit configured to map the interpolated texture data items onto the interpolated model data item, using a third manner designated by a fifth control instruction included in the control instructions; and
an output unit configured to output data acquired by the mapping unit as computer graphics data.

13. The apparatus according to claim 12, wherein:
the data selection unit is configured to determine what capacity of data be stored in a memory, based on the first control instruction;
the determination unit is configured to determine the arrangement of the at least one model data items and the texture data items to enhance a hit rate of the texture data items in the memory and to minimize number of operations of loading the texture data items; and the storage unit is configured to store the texture data items into the memory after performing an affine transformation process on the texture data items for converting the texture data items into normalized rectangular data, or after rearranging the texture data items, in order to arrange the texture data items in the arrangement determined by the determination unit.

14. The apparatus according to claim 12, wherein the rendering-data selection unit is configured to perform switching between selection, from the stored texture data items, of texture data items closest to the second control instruction, and selection, from the stored texture data items, of a single texture data item closest to the second control instruction, the rendering-data selection unit being configured to increase number of texture data items to be selected from the stored texture data items, at the time that a first change included in changes in the conditions indicates that quality is to be enhanced, the rendering-data selection unit being configured to decrease the number of texture data items to be selected from the stored texture data items, at the time that a second change included in the changes in the conditions indicates that quality fails to be enhanced, the rendering-data selection unit being configured to select first texture data corresponding to a change included in the changes in the conditions, at the time that the first texture data covers second texture data corresponding to another change included in the changes in the conditions.

15. The apparatus according to claim 12, wherein:
the generation unit is configured to generate, as the second control instruction, a material characteristic instruction for causing a characteristic of a texture material to be reflected in accordance with the interpolated texture data; and
the rendering-data selection unit is configured to select, from the stored model data items and the stored texture data items, a model data item corresponding to the material characteristic instruction, or animation data contained in the model data item corresponding to the material characteristic instruction.

16. The apparatus according to claim 12, wherein the correction unit is configured to receive, as the third control instruction, an instruction to correct each of the texture data items selected for rendering, in accordance with physical model data based on a physical law, or in accordance with physical model data based on texture data items included in the texture data items.

17. The apparatus according to claim 12, wherein the correction unit is configured to receive, as the third control instruction, an instruction to correct position coordinates of vertex data contained in the model data item selected for rendering, in accordance with the texture data items selected for rendering, the model data item selected for rendering, or the animation data.

18. The apparatus according to claim 12, wherein:
if the correction unit is configured to perform a greater scale of correction on the texture data items selected for rendering and the model data item selected for rendering, the correction unit is configured to impart a lower degree of reliability to the texture data items selected for rendering and the model data item selected for rendering; and
if the lower degree of reliability is imparted, the interpolation unit is configured to receive, as the fourth control instruction, an instruction to set a lower interpolation rate.

19. The apparatus according to claim 12, wherein:
the generation unit is configured to generate reference texture data as the fourth control instruction; and
the interpolation unit is configured to correct the interpolated texture data items to make the interpolated texture data items close to the reference texture data.

20. The apparatus according to claim 12, wherein the generation unit is configured to generate the control instructions by analyzing the model data items and the texture data items.

21. The apparatus according to claim 12, wherein the generation unit is configured to analyze each of the texture data items to divide each of texture data items into a first portion which includes a continuous change and is expressed by physical model data, and a second portion which includes a discontinuous change and is only expressed by each of the texture data items, the generation unit being configured to generate the physical model data based on a physical law or the analysis result of each of the texture data items, the generation unit being configured to generate the control instruction to select each of the texture data items, the control instruction indicating a difference between the first portion and each of the texture data items.

22. The apparatus according to claim 21, wherein the generation unit is configured to generate the control instruction to the data selection unit, the rendering-data selection unit, the correction unit, the interpolation unit and the mapping unit.

23. A texture mapping method comprising:
acquiring a plurality of texture data items acquired or generated under a plurality of conditions, and a plurality of model data items;
generating control data used for texture mapping, in accordance with the texture data items and the model data items;
generating control instructions for texture mapping processes corresponding to the control data;
selecting at least one model data item and texture data items from the texture data items and the model data items, based on a first control instruction included in the control instructions;
determining arrangement of the at least one model data item and the texture data items;
storing the at least one model data item and the texture data items, based on the determined arrangement;
selecting, from the stored model data item and the stored texture data items, a model data item and a plurality of texture data items used for rendering, based on a second control instruction included in the control instructions;
correcting the model data item selected for rendering and the texture data items selected for rendering, using a first manner designated by a third control instruction included in the control instructions;
performing interpolation on the corrected model data item and on the corrected texture data items, using a second manner designated by a fourth control instruction included in the control instructions;
mapping the interpolated texture data items onto the interpolated model data item, using a third manner designated by a fifth control instruction included in the control instructions; and
outputting data acquired by mapping the interpolated texture data items as computer graphics data.

24. A texture mapping method comprising:
acquiring a plurality of texture data items acquired or generated under a plurality of conditions, and a plurality of model data items, and control data used for texture mapping;

generating control instructions corresponding to the control data for texture mapping processes;

selecting at least one model data item and texture data items from the texture data items and the model data items, based on a first control instruction included in the control instructions;

determining arrangement of the at least one model data items and the texture data items;

preparing a storage unit which stores the at least one model data item and the texture data items, based on the determined arrangement;

selecting, from the stored model data item and the stored texture data items, a model data item and a plurality of texture data items used for rendering, based on a second control instruction included in the control instructions;

correcting the model data item selected for rendering and the texture data items selected for rendering, using a first manner designated by a third control instruction included in the control instructions;

performing interpolation on the corrected model data item and on the corrected texture data items, using a second manner designated by a fourth control instruction included in the control instructions;

mapping the interpolated texture data items onto the interpolated model data item, using a third manner designated by a fifth control instruction included in the control instructions; and outputting data acquired by mapping the interpolated texture data items as computer graphics data.

25. A texture mapping program stored in a computer readable medium, comprising:

means for instructing a computer to acquire a plurality of texture data items acquired or generated under a plurality of conditions, and a plurality of model data items;

means for instructing the computer to generate control data used for texture mapping, in accordance with the texture data items and the model data items;

means for instructing the computer to generate control instructions for texture mapping processes corresponding to the control data;

means for instructing the computer to select at least model data item and texture data items from the texture data items and the model data items, based on a first control instruction included in the control instructions;

means for instructing the computer to determine arrangement of the at least one model data item and the texture data items;

means for instructing the computer to access to a storage unit configured to store the at least one model data item and the texture data items, based on the determined arrangement;

means for instructing the computer to select, from the stored model data item and the stored texture data items, a model data item and a plurality of texture data items used for rendering, based on a second control instruction included in the control instructions;

means for instructing the computer to correct the model data item selected for rendering and the texture data items selected for rendering, using a first measure designated by a third control instruction included in the control instructions;

means for instructing the computer to perform interpolation on the corrected model data item and on the corrected texture data items, using a second measure designated by a fourth control instruction included in the control instructions;

means for instructing the computer to map the interpolated texture data items onto the interpolated model data item, using a third measure designated by a fifth control instruction included in the control instructions; and means for instructing the computer to output data acquired by mapping the interpolated texture data items as computer graphics data.

26. A texture mapping program stored in a computer readable medium, comprising:

means for instructing a computer to acquire a plurality of texture data items acquired or generated under a plurality of conditions and a plurality of model data items, and control data used for texture mapping;

means for instructing the computer to generate control instructions corresponding to the control data for texture mapping processes;

means for instructing the computer to select at least one model data item and texture data items from the texture data items and the model data items, based on a first control instruction included in the control instructions;

means for instructing the computer to determine arrangement of the at least one model data item and the texture data items;

means for instructing the computer to access to a storage unit configured to store the at least one model data item and the texture data items, based on the determined arrangement;

means for instructing the computer to select, from the stored model data item and the stored texture data items, a model data item and a plurality of texture data items used for rendering, based on a second control instruction included in the control instructions;

means for instructing the computer to correct the model data item selected for rendering and the texture data items selected for rendering, using a first measure designated by a third control instruction included in the control instructions;

means for instructing the computer to perform interpolation on the corrected model data item and on the corrected texture data items, using a second measure designated by a fourth control instruction included in the control instructions;

means for instructing the computer to map the interpolated texture data items onto the interpolated model data item, using a third measure designated by a fifth control instruction included in the control instructions; and means for instructing the computer to output data acquired by mapping the interpolated texture data items as computer graphics data.

* * * * *